(No Model.)
J. DE WITT.
DRAFT EQUALIZER.
No. 367,275. Patented July 26, 1887.
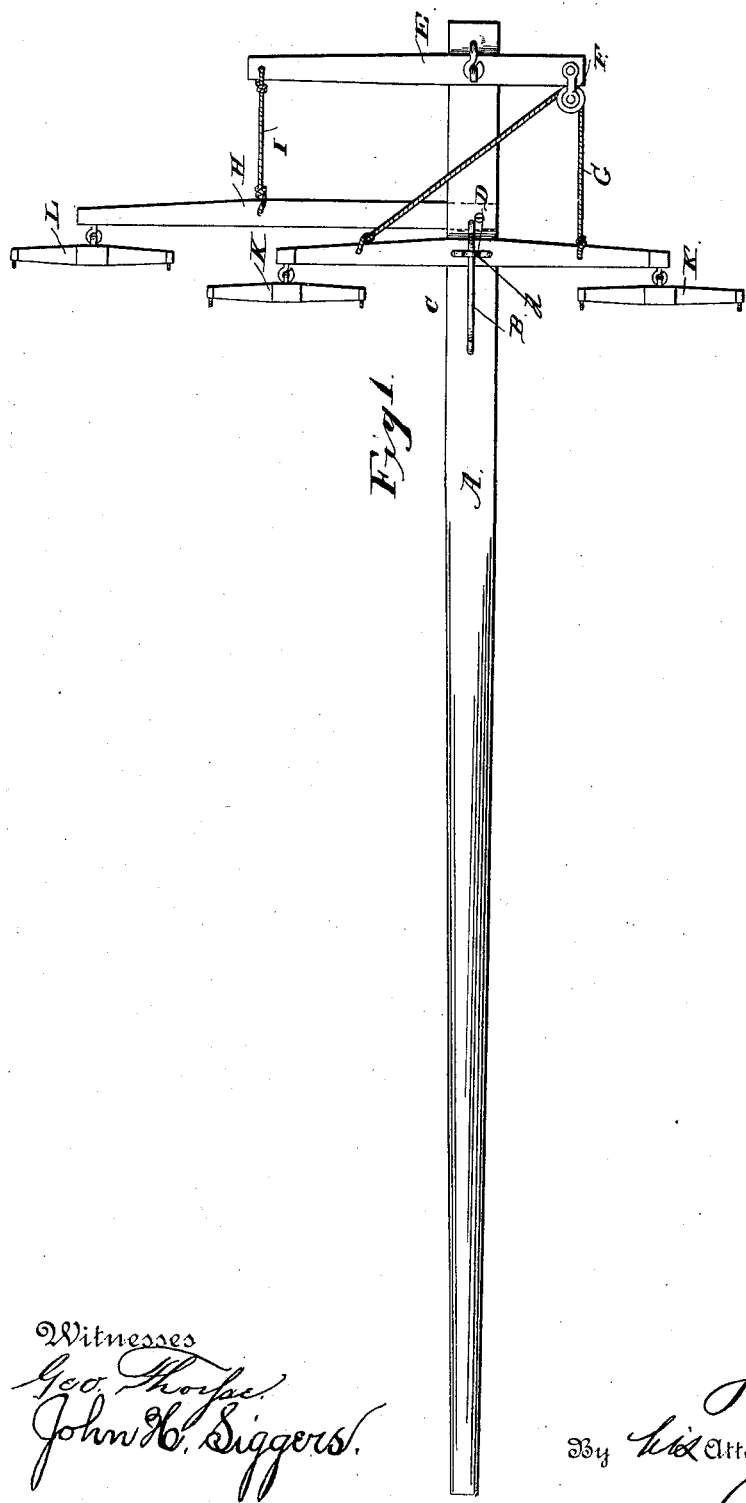
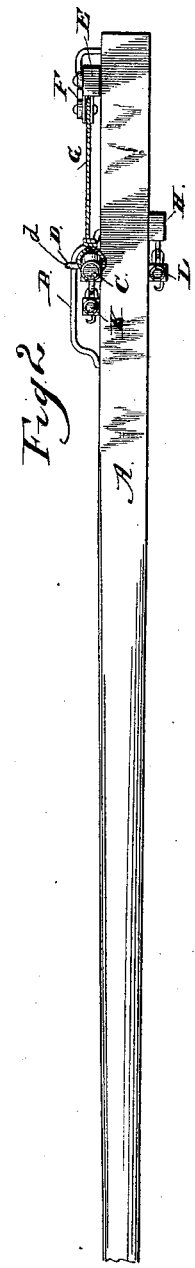
Witnesses
Geo. Thorpe
John H. Siggers
Inventor
John De Witt
By his Attorneys
C. A. Snow & Co.

UNITED STATES PATENT OFFICE.

JOHN DE WITT, OF LAYTON, ILLINOIS.

DRAFT-EQUALIZER.

SPECIFICATION forming part of Letters Patent No. 367,275, dated July 26, 1887.

Application filed January 17, 1887. Serial No. 224,606. (No model.)

*To all whom it may concern:*

Be it known that I, JOHN DE WITT, a citizen of the United States, residing at Layton, in the county of Schuyler and State of Illinois, have invented a new and useful Improvement in Draft-Equalizers, of which the following is a specification.

My invention relates to an improvement in draft-equalizers; and it consists in the peculiar construction and combination of devices, that will be more fully set forth hereinafter, and particularly pointed out in the claim.

In the drawings, Figure 1 is a top plan view of a draft-equalizer embodying my improvements. Fig. 2 is a side elevation of the same.

A represents the tongue, which is provided on its upper side, at a suitable distance from the rear end, with a longitudinal guide rod or yoke, B.

C represents a doubletree, which is provided at its center, on its upper side, with a keeper, D, which engages the guide rod or yoke, and thereby secures the doubletree thereto, so that the latter may move longitudinally forward and back upon the tongue. This keeper D is bent to form a rigid eye or loop, d, which fits snugly over the guide rod or yoke B, and is free to slide thereon with the doubletree. This keeper is rigidly secured or affixed at its ends to the doubletree, and its eye or loop d engages the yoke so closely that it prevents the doubletree from turning to any appreciable extent, the said eye or loop binding on the yoke when the doubletree is turned slightly, so that the latter is locked against movement while the vehicle is being turned, all the strain or draft in turning the vehicle in one direction taking place on the whiffletree L, hereinafter fully described.

E represents a lever-bar, which is pivoted at a point about one-third of its length from one end to the tongue at a suitable distance in rear of the doubletree. To the short end of the lever-bar E is attached a sheave, F.

G represents a rope or chain, which passes around the sheave F and has its ends attached to the doubletree C at points equidistant from the ends of the said doubletree.

H represents a lever-bar, which has one end pivoted under the tongue at a slight distance in rear of the doubletree, the said lever-bar extending from the same side of the tongue with the long arm of the lever-bar E.

I represents a rope or chain, which has one end attached to the outer end of the bar E, the opposite end of the said rope or chain being attached to the lever-bar H at a suitable distance from the free end thereof. A pair of singletrees, K, are attached to the ends of the doubletree C, one of the said singletrees being on each side of the tongue, and a third singletree, L, is attached to the free end of the lever-bar H. By this combination and arrangement of devices three horses may be attached to a vehicle and the draft equalized, so that each horse will only have to exert the same power in drawing the vehicle. When the doubletree moves forward on the guide rod or yoke, the free end of the lever-bar H will be drawn rearwardly, and thereby cause the horse which is attached to the singletree L to draw his full share of the load. In the event that the horse which is attached to the singletree L should draw more than his due portion of the load, the free end of the lever-arm L will be moved forwardly, thereby causing the long arm of the lever-bar E to also move forwardly and the short arm of the said lever to move rearwardly, and thereby draw rearwardly upon the doubletree, so as to cause a part of the load to be shifted onto the horses attached to the singletrees K.

I attach especial importance to the peculiar form of the fixed or rigid keeper D, having the loop or eye d, which closely fits the yoke B, and is adapted to bind thereon, to prevent the doubletree from turning any appreciable extent, and thereby lock the doubletree against movement on the draft, all the draft in turning the vehicle in one direction being brought on the whiffletree L, whereby the weight on the horses' necks attached to the doubletree K is released.

With my improved draft-equalizer I am enabled to obviate all the side draft incident to the majority of devices of this class, which is very important.

Having thus described my invention, I claim—

The combination of the tongue, the longitudinal yoke B thereon, the doubletree arranged between the yoke and the tongue, and having the longitudinal keeper d arranged transversely with relation to the yoke, and thereby adapting the doubletree to move endwise to avoid side strain, (the yoke B being adapted to permit the doubletree to move longitudinally on the tongue,) the lever E, pivoted to the tongue in rear of the doubletree and having a sheave or pulley at its short end, the rope G, passing around the pulley or sheave and having its ends attached to the doubletree near the ends thereof, the lever H, having one end pivoted to the tongue at a point between the doubletree and lever E, said lever H projecting from one side of the tongue, the cord I, connecting the long arm of lever E with the lever H, and the singletrees attached to the doubletree and to the lever L, substantially as described.

In testimony that I claim the foregoing as my own I have hereto affixed my signature in presence of two witnesses.

JOHN DE WITT.

Witnesses:
J. R. STEPHENS,
D. M. IRWIN.